G. A. LYON.
AUTOMOBILE BUFFER ATTACHER.
APPLICATION FILED OCT. 15, 1920.

1,410,938. Patented Mar. 28, 1922.

Inventor
George Albert Lyon
By his Attorney
Harry L. Duncan

UNITED STATES PATENT OFFICE.

GEORGE ALBERT LYON, OF PHILADELPHIA, PENNSYLVANIA.

AUTOMOBILE BUFFER ATTACHER.

1,410,938.  Specification of Letters Patent.  Patented Mar. 28, 1922.

Application filed October 15, 1920. Serial No. 417,177.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffer Attachers, of which the following is a specification, taken in connection with the accompanying drawing.

This invention relates to angle bolt or aligning buffer attachers by which automobile buffers or bumpers or other fittings or attachments having supporting members may be secured or clamped to the apertured frame members of automobiles or other vehicles. When, for instance, the channel frame members of an automobile are formed with several round or other suitable frame apertures at substantially a standard distance apart, angle bolt attachers having any suitable bent over or holding ends or contact portions may be inserted into these apertures from the outside of the frame member and then tipped up or turned to bring their bent over or holding ends into laterally projecting position in which they may be retained by the aligning action of the bolt stems and also, if desired by suitable tightening nuts on the stems, which may rigidly clamp them in projecting position on the frame members so as to more readily engage and secure the supporting members of the automobile buffer or other attachment. The invention in this application which is a continuation in part of my co-pending application, Serial No. 276,899, filed February 14, 1919, which has now matured into Patent 1,358,687, of November 9, 1920, relates especially to attachers of this general character in which the attacher stems may be provided with suitable hexagonal or other spacing washers which are advantageous in spacing the supporting member of the attachment away from the frame member when desired, also when these spacing members or washers fit fairly tightly around the attacher stems they can exert a desirable aligning action in connection therewith, so as to minimize tipping after the attacher has been inserted into the frame aperture either from the outside or inside of the frame member and secured in place in connection with the attachment supporting member by any suitable fastening means. When, as is preferable, these spacing members or washers have threaded engagement with the attacher stems they may be loosely connected thereto before the holding end of the attacher is inserted into the frame aperture from the outside; and then these spacing washers may be screwed up tightly into engagement with the frame member, so as to rigidly hold the attacher stem in projecting position while the buffer or other automobile attachment is being put in place and fastened to the different attacher stems.

In the accompanying drawing showing in a somewhat diagrammatic way various illustrative embodiments of this invention.

Figure 1:
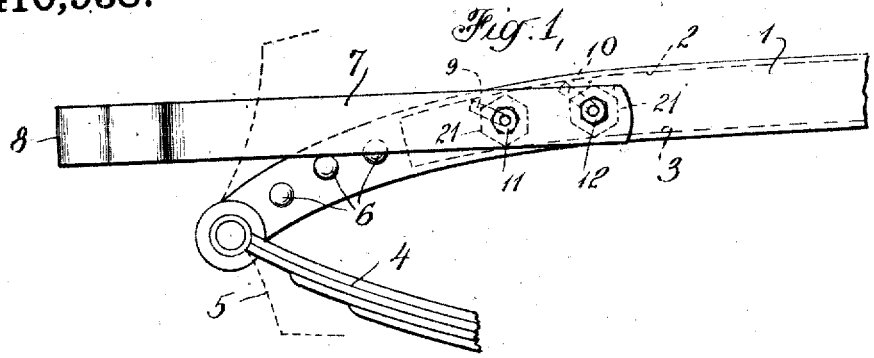
Fig. 1 is an elevation showing one type of attacher or angle bolt in securing position in connection with an automobile buffer and frame member.
Figure 2:
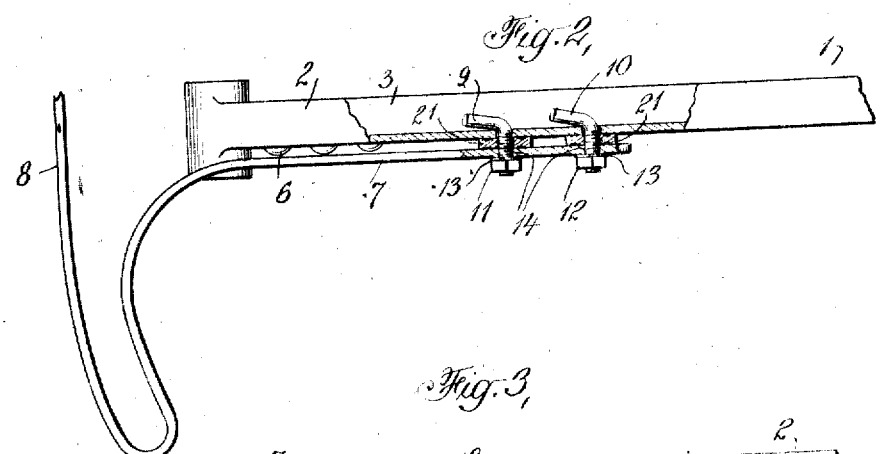
Fig. 2 is a top view partly in section of this arrangement.

The automobile or other vehicle buffer or bumper may be of any desired form and construction and may have a resilient or other front portion 8 to which is secured as by the interposed loop the resilient or other supporting member 7. The frame members of the automobile may be of any desired channel iron or angle iron type of construction and as indicated in Figs. 1 and 2 the frame may comprise the web 1 and the integral frame flanges 2, 3 to which the usual mud guards and splash pan 5 may be riveted or otherwise secured, and the rivets 6 may secure to the end of each of these frame members or goose necks the connection for the spring 4 or other part of the automobile. These frame ends may be conveniently formed with circular or other frame apertures, such as 25 shown in Figs. 4 and 5, and which may be punched or otherwise formed in the frame members and located at suitable distances from their ends and preferably at a substantially uniform distance apart so that the attachment of automobile buffers and other fittings may be facilitated. The spacing of these frame apertures preferably corresponds with the distance between the adjusting slots, holes or other securing apertures which are formed in the supporting members of automobile buffers of various types and as shown in Figs. 1 and 2, the supporting member 7 of the buffer may be formed with securing apertures or holes 14, although one or more of these slots may be given a perpendicularly or obliquely inclined position as in the case of the adjusting slot 16 in Fig. 3.

Figure 4:
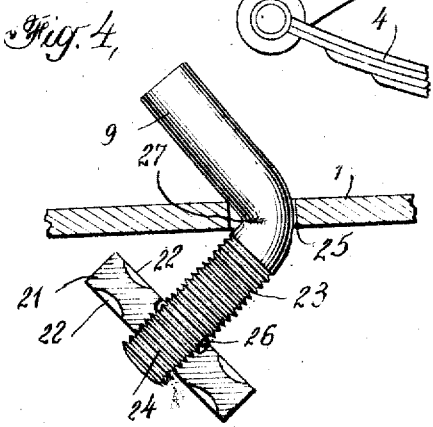
Fig. 4 is an enlarged transverse view showing the insertion of one of these attacher bolts.
Figure 5:
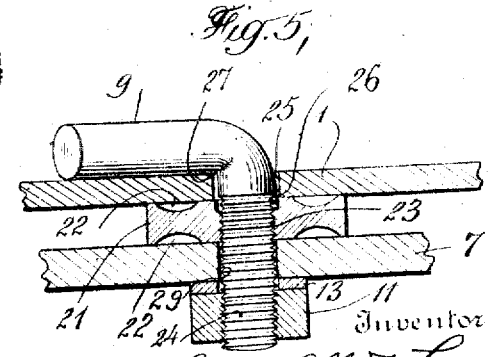
Fig. 5 is a corresponding sectional view showing the attacher in securing position.

These angle bolt attachers which are preferably formed of one piece of stiff and strong tempered or cold bent steel or other suitable material are provided with any suitable laterally projecting holding or contact portions such as 9. shown in Figs. 4 and 5 and as indicated it is sometimes desirable to form the attacher with a relatively sharp angle adjacent its contact portion 27, so as to engage the frame member correspondingly nearer the stem. This may be produced by any suitable swaging or forging operation which may also somewhat reduce the cross section of the adjacent bend which facilitates the insertion of the attacher. The attacher stems 24 of these angle bolts may be formed with any desired type of fastening device, such for instance as the screw threads indicated. In that case the spacing or holding nuts or washers 21, which may sometimes have the concave sides 22 to ensure more definite peripheral contact with the adjacent parts may have the threaded holes 23 for cooperation with the theaded attacher stems, and counterbored portions 26 of greater or less extent are sometimes desirable. One convenient way of inserting the attacher is shown in Fig. 4 and the hexagonal spacing washer or nut 21 may be screwed to some extent on the end of the attacher stem which may then be inserted into the frame aperture 25, the holding washer or nut preventing undesirable insertion into the aperture, so that the attacher cannot fall through the frame aperture. Then the polygonal or other holding nut may be screwed home on the attacher stem, so as to definitely and tightly hold the attacher in position on the frame member with its transversely extending or holding contact portion 9 in engagement with the inside surface or portion of the frame member, thus preventing withdrawal, while the holding end is preferably so long as to prevent undesirable rotation of the attacher stem during this fastening operation. In some cases, however, the stem of the attacher may be inserted through the frame aperture either from the outside or the inside of the frame members, and the stem manually held while the holding nut or washer is screwed home to hold these parts on the frame. Then the supporting member of the automobile buffer or other attachment may be put in place over the projecting attacher stems 24, for which purpose the securing holes or adjusting slots, such as 29 shown in Fig. 5 may be formed in the supporting members, and then any suitable fastening means such as the nuts 11 and locking washers 13, if desired, may be put in place on the projecting attacher stems so as to strongly and rigidly hold all of the parts on the frame member.

Figure 3:
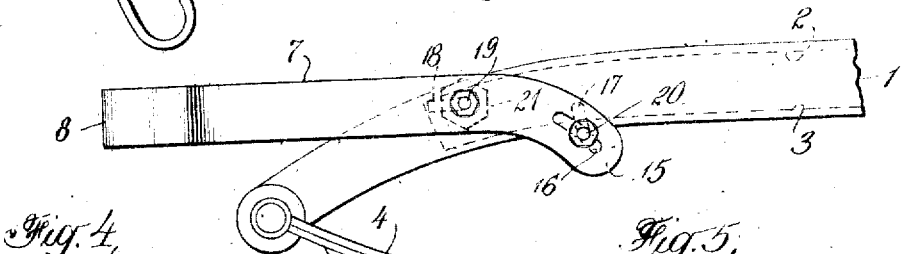
Fig. 3 is an elevation showing another illustrative arrangement of these attacher devices.

As is indicated in Fig. 3, the frame members may in some cases each be formed with a single frame aperture with which one of these angle bolt attachers such as 18 may cooperate to form a definite point of support for the automobile buffer or other attachment although of course longitudinal or angular adjusting slots or apertures in the supporting members of the attachment may be used to adjustably connect the same to the stem 19 of the attacher. It is sometimes desirable to have an angular adjusting slot such as 16 in the supporting member which for this purpose may have a depending securing end 15 and in some cases it is desirable to have cooperating therewith a hook bolt of the general type described in the Lyon Patent 1,266,836 of May 21, 1918. The end 16 of such a hook bolt retainer may extend around and engage the lower frame flange 3 for instance so as to strongly secure the buffer supporting member thereto through the nuts or other fastening means used on the projecting stem 20 of this hook bolt, which of course can be longitudinally adjusted in the slot 16 so as to insure the desired angular position of the forwardly projecting parts of the buffer.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims:

1. In automobile buffers, an automobile having flanged frame members each provided with a plurality of spaced frame apertures, a splash pan co-operating with the inner sides of said frame members, a buffer having supporting members formed with apertures and adapted to co-operate with said frame members, angle bolt attachers having laterally projecting holding ends and aligning stems extending through said frame apertures, spacing and holding washers threaded on said stems and positioning said supporting members away from said frame members and securing nuts on said stems to hold said buffer members in position.

2. In automobile buffers, an automobile having flanged frame members provided with a plurality of spaced frame apertures, a buffer having supporting members formed with apertures and adapted to co-operate with said frame members, angle bolt attachers having laterally projecting holding ends and aligning stems extending through said frame apertures, spacing and holding washers on said stems and positioning said supporting members away from said frame members and securing means on said stems to hold said buffer members in position.

3. In attaching devices adapted for use in securing an automobile buffer attachment to an automobile having flanged frame members provided with frame apertures, a bolt attacher having an aligning stem adapted to extend through an aperture in the attachment and having an integral laterally bent holding end of such size as to be adapted to be inserted through one of the frame apertures from the outside of the frame member and a spacing and holding washer threaded on the attacher stem to prevent undesirable insertion of said attacher stem into said frame apertures to position said attachment away from the co-operating frame member.

4. In attaching devices adapted for use in securing an automobile buffer attachment to an automobile having flanged frame members provided with frame apertures, a bolt attacher having an aligning stem adapted to extend through an adjusting aperture in the attachment end having an integral laterally projecting holding end of such size as to be adapted to be inserted through one of the frame apertures from the outside of the frame member and a spacing and holding washer threaded on the attacher stem to prevent undesirable insertion of said attacher stem into said frame apertures to position said attachment away from the cooperating frame member.

5. In attaching devices adapted for use in securing an automobile buffer to an automobile having flanged frame members provided with frame apertures, a bolt attacher having an aligning stem adapted to extend through an aperture in the attachment and having an integral laterally projecting holding end of such size as to be adapted to be inserted through one of the frame apertures from the outside of the frame member and a spacing washer on the attacher stem to position said attachment away from the cooperating frame member.

6. In attaching devices adapted for use in securing an automobile buffer attachment to an automobile having flanged frame members provided with frame apertures, a one-piece bolt attacher having an aligning stem adapted to extend through an aperture in the attachment and having a laterally projecting holding end adapted to be inserted through one of the frame apertures from the outside of the frame member and a concave faced spacing and holding nut threaded on the attacher stem and projecting therefrom transversely to prevent undesirable insertion of said attacher stem into said frame apertures and to position said attachment away from the cooperating frame member.

7. In attaching devices adapted for use in securing an automobile attachment to an automobile having flanged frame members provided with frame apertures, a bolt attacher having a stem adapted to extend through an aperture in the attachment and having a laterally projecting holding end of such size as to be adapted to be inserted through one of the frame apertures from the outside of the frame member and a spacing and holding nut threaded on the attacher stem and projecting therefrom transversely to prevent undesirable insertion of said attacher stem into said frame apertures and to position said attachment away from the cooperating frame member.

8. In attaching devices adapted for use in attaching an automobile buffer to an automobile having flanged frame members provided with spaced frame apertures, a one-piece angle bolt attacher having a threaded stem and a laterally projecting holding portion adapted to be inserted into said apertures from the outside of said frame members and spacing and holding washers having more than three times the diameter of said stem and threaded thereon in such position as to prevent undesirable insertion thereof into said frame members and adapted to space the co-operating portions of said buffer away from said frame members.

GEORGE ALBERT LYON.